Oct. 13, 1953        F. M. ADAMS        2,655,122
ANIMAL ALARM SCRATCHING DEVICE
Filed March 2, 1951        2 Sheets-Sheet 1

INVENTOR
*Fred M. Adams*
BY *Robert van Sickler*
ATTORNEY

Oct. 13, 1953 F. M. ADAMS 2,655,122
ANIMAL ALARM SCRATCHING DEVICE
Filed March 2, 1951 2 Sheets-Sheet 2

INVENTOR
Fred M. Adams
BY Robert van Sickler
ATTORNEY

Patented Oct. 13, 1953

2,655,122

UNITED STATES PATENT OFFICE 2,655,122

ANIMAL ALARM SCRATCHING DEVICE

Fred M. Adams, Shreveport, La.

Application March 2, 1951, Serial No. 213,566

4 Claims. (Cl. 116—1)

This invention relates to alarms, particularly of a type which serves a dual purpose of utilizing an animal scratching board to sound the alarm.

Most of the conventional devices provided for animals to sharpen their claws have been those designed to localize this habit of animals. Although the subject device has the same objective, it is appreciated that this facility for animals could be combined with an additional useful construction as disclosed herein.

It is an object then, of this invention to provide a scratching medium to be applied to a door or entrance.

A further object is to combine this device with other constructions so an alarm or sound is created to notify the occupants of a house that the animal is at the particular location.

An additional object is to notify the occupants that the animal wants to be let in or out of the house, dependent upon the location of the device.

A still further object is to provide a device that is sturdy but may be freely operated by the animal to sound an alarm.

Referring to the drawings:

Figure 2 is a vertical sectional view of the device;

Figure 3 is a front elevation, while

Figure 4 is a cross sectional view taken on the line 4—4 of Figure 3.

Figure 1:
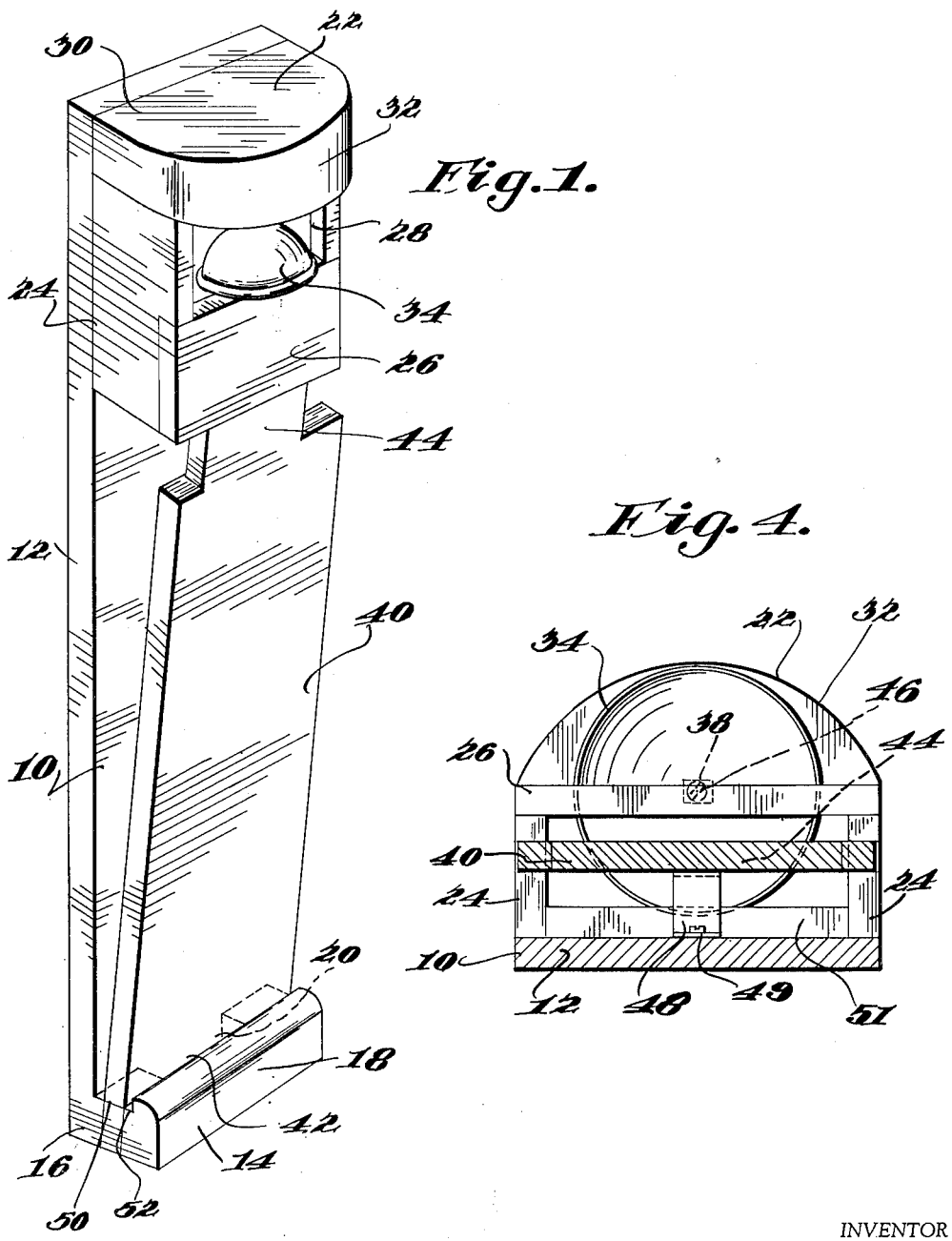
Figure 1 is a perspective view of the animal scratcher alarm.

In the drawings where like reference characters denote like parts, the numeral 10 refers to the main support to be attached to the entrance door. The vertical back member 12 is provided with a base or leg portion 14 formed from or attached to the back portion. This base has sides 16 and front 18 which will form an open area 20 for a purpose to be later explained.

Formed from or attached to the top of the backing 10 is a housing 22 having side members 24. A front panel 26 having an open area 28 is secured to the top and sides 24 and is positioned at right angles to the top plate 30. This top plate 30 is provided with an arcuate front edge 32 which extends well past the front edge of the panel 26.

Figures 2, 3:
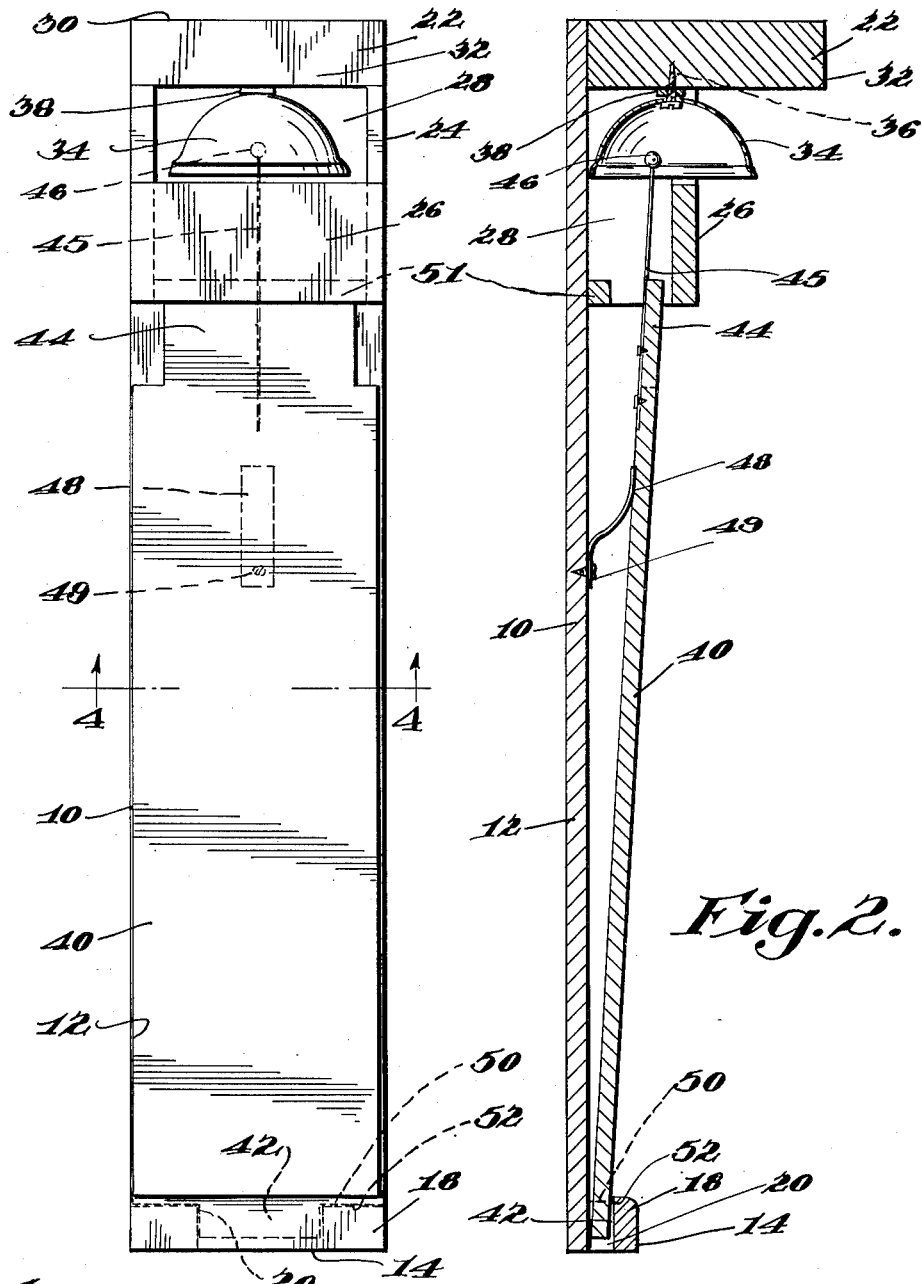

A conventional bell 34, of circular formation, is attached to the underneath side of the top plate 30 by any well known means as by the screw 36 indicated particularly in Figure 2. Any type of washer or spacer may be used but a rubber washer 38 is shown in the particular embodiment.

An operating scratching panel 40 is provided and has a reduced portion 42 formed from the bottom portion of the panel 40 which is adapted to be loosely contained in the opening 20 of the main support leg or base portion 14. The upper end of the panel 40 is provided with a reduced portion 44 which is adapted to freely move within the open area 28 of the housing. Secured to this reduced portion 44 is a metal knocker or clapper 46 which is adapted to strike the bell 34 upon movement of the panel 40 about its seat pivot at the base. A conventional leaf or compression spring 48 is secured at 49 to the front of the vertical main support portion and is adapted to yieldingly bear against the front movable panel, to maintain it in extended position. A horizontal brace member 51 is secured to the main support 14 to space the two side walls 24.

It is to be noticed that the bottom end of the panel 40 is easily supported on the base 18 by the two ends 50 resting on the edges 52 of the base 18 with the reduced portion 42 extending well into the open area 20. There are no wearing parts, and movement of the panel 40 against the action of the spring 48 is easily effected.

With particular reference to Figures 1 and 2, it can be seen that the upper portion of the panel member 40 extends well into the open area formed in the housing 22, so with the means provided in the base of the housing, the panel is relatively held captive with the confines of the main supports, and yet permits of freedom of movement.

The device may be readily attached to the door, in front or back, by nailing, screws or hooks within reach of the animal.

Although not specifically shown the outer surface of the panel 40 may be of a soft wood that has been roughened or serrated to provide an area more suitable for the indicated purpose. It can be appreciated that an animal, a creature of habits, will soon become accustomed to using the panel surface for such purpose first because of its location, second because of the particular surface, third because of the association of hearing the alarm and the approximately immediately opening of the door.

It can be appreciated that while the subject invention was designed primarily for dogs, it can be understood that cats may easily become accustomed to its use with the desired resultant objective.

What is claimed is:

1. In a scratching device for animals, the combination with a bell and clapper of a main support, a base, an upper housing and a pivotally mounted scratching panel, said upper housing having an open bottom and a partially open front, said bell received in said housing and said clapper secured to the upper portion of said panel to extend within housing, said panel pivotally mounted in the base of said main support whereby movement of said panel will cause said bell to be sounded.

2. In a scratching device for animals, the combination with a bell and clapper of a main support, a base, an upper housing and a pivotally mounted scratching panel, said upper housing having an open bottom and a partially open front, said bell received in said housing and said clapper secured to the upper portion of said panel to extend within housing, said panel pivotally mounted in the base of said main support whereby movement of said panel will cause said bell to be sounded, and means comprising a spring secured to said support and adapted to bear against the rear of said panel to maintain said panel in extended position.

3. In a scratching device for animals, the combination with a bell of a main support and a pivotal scratching panel mounted thereon, a housing formed at the top of said support having an open bottom and a partially open front, said bell contained within said housing, the top of said panel provided with opposing shoulders and adapted to move within said housing, a clapper secured to the top portion of said scratching panel and adapted to have cooperative engagement with said bell whereby movement of said panel will cause said bell to be sounded, the base portion of said support having an outwardly extending ledge with a central opening formed therein, the bottom of said panel provided with opposed shoulders adapted to seat upon said ledge with a central lower portion received in said central opening to pivotally support said panel and prevent dislodgement of said panel therefrom.

4. In a scratching device for animals, the combination with a bell of a main support and a pivotal scratching panel mounted thereon, a housing formed at the top of said support having an open bottom and a partially open front, said bell contained within said housing, the top of said panel provided with opposing shoulders and adapted to move within said housing, a clapper secured to the top portion of said scratching panel and adapted to have cooperative engagement with said bell whereby movement of said panel will cause said bell to be sounded, the base portion of said support having an outwardly extending ledge with a central opening formed therein, the bottom of said panel provided with opposed shoulders adapted to seat upon said ledge with a central lower portion received in said central opening to pivotally support said panel and prevent dislodgement of said panel therefrom, and means comprising a spring secured to said support and adapted to bear against the rear of said panel to maintain said panel in extended position.

FRED M. ADAMS.

References Cited in the file of this patent
UNITED STATES PATENTS

| Number | Name | Date |
|---|---|---|
| 56,160 | Baker | July 10, 1866 |
| 602,573 | Coggeshall | Apr. 19, 1898 |
| 1,195,003 | Gwynn | Aug. 15, 1916 |
| 2,536,460 | Paardecamp | Jan. 2, 1951 |